United States Patent [19]

Wilson, III

[11] Patent Number: 4,981,244

[45] Date of Patent: Jan. 1, 1991

[54] PIN BELT FOR MOVEMENT OF PERFORATED STRIP

[75] Inventor: Joseph T. Wilson, III, Endicott, N.Y.

[73] Assignee: International Business Machines Corp., Armonk, N.Y.

[21] Appl. No.: 153,394

[22] Filed: Feb. 8, 1988

[51] Int. Cl.[5] .................... G03B 1/30

[52] U.S. Cl. .................... 226/87; 226/74

[58] Field of Search .................... 226/74, 75, 82, 87, 226/76; 400/616–616.2

[56] References Cited

U.S. PATENT DOCUMENTS

| | | | |
|---|---|---|---|
| 3,066,548 | 12/1962 | Shapiro | 226/87 |
| 3,392,893 | 7/1968 | Bennett et al. | 226/74 |
| 3,688,959 | 9/1972 | Staneck et al. | 226/75 |
| 3,825,162 | 7/1974 | Hubbard | 226/74 |
| 3,938,721 | 2/1976 | Staneck et al. | 226/75 |
| 4,193,527 | 3/1980 | Rutishauser | 226/74 |
| 4,316,567 | 2/1982 | Grear et al. | 226/74 |
| 4,453,660 | 6/1984 | Cornell et al. | 226/74 |
| 4,473,179 | 9/1984 | Bauer | 226/74 |
| 4,611,737 | 9/1986 | Hubbard et al. | 226/74 |

FOREIGN PATENT DOCUMENTS

| | | | |
|---|---|---|---|
| 60-21273 | 2/1985 | Japan . | |
| 446193 | 4/1936 | United Kingdom | 226/87 |
| 587037 | 4/1947 | United Kingdom . | |
| 649199 | 1/1951 | United Kingdom . | |

OTHER PUBLICATIONS

IBM Technical Disclosure Bulletin, vol. 23, No. 7B, Dec. 1980, pp. 3111–3112, R. W. Cornell.
IBM Technical Disclosure Bulletin, Forms Feed Belt, vol. 25, No. 6, Nov. 1982, Blue andd Gentry.
IBM Technical Disclosure Bulletin, Forms Feed Tractor, vol. 20, No. 11A, Apr. 1978, McCray.
Partial Translation of PEPA 43-23565, Y. Furuichi, Jul. 17, 1964, Japanese Published Patent Application.

*Primary Examiner*—Katherine A. Matecki
*Attorney, Agent, or Firm*—John S. Gasper

[57] ABSTRACT

A feed mechanism for transporting paper has an endless band with transport pins for insertion into the perforations in circular perforations in the paper. The feed pins are part of drive elements attached through perforations in an endless flexible band to gear teeth which are engaged by grooves in a drive pulley. The transport pins have a cap portion on top of a base portion. The cap portion is tapered in the shape of a circular involute and extends from the top of the truncated circular conical base portion. The perforations in the band have the shape of an ellipse with the major axis thereof aligned in the direction of movement of the band. The band can be either thin flexible steel or polymer and the pin portion and gear portion of the drive elements can be integral and molded from an elastomer material through the elliptical perforations in the band.

3 Claims, 5 Drawing Sheets

PIN BELT FOR MOVEMENT OF PERFORATED STRIP

FIELD OF THE INVENTION

This invention relates to a tractor feed mechanism for a printer and particularly to a pin belt used in such mechanism.

BACKGROUND OF THE INVENTION

The common paper feed mechanism has an endless flexible pin belt. The belt has a row of uniformly spaced feed pins extending perpendicular relative to the outer surface of the belt. The belt has drive teeth around its inside surface and is entrained around and has a trace between a pair of spaced pulleys or sprockets with grooves that mesh with the drive teeth. The belt may comprise a thin flexible strip with the pin and drive teeth attached thereto. In one form of attachment, the teeth and pins are molded through perforations in the belt. One problem with such belts is that they tend to crack at the perforations because of stresses produced by load forces applied to the pins by the paper and to the gear teeth by the pulleys. The paper has one or more rows of uniformly spaced perforations and is driven by pins which enter the perforations near one end of the trace and withdraw from the perforations at the other end of the trace. The belt and the trace are designed so that several pins are within the perforations and in engagement with the paper at one time. The pins move into the perforations from below as the belt unwraps from the pulley and moves on an incline below the paper. It is common practice to contour the pins to ease the entry into the perforations. Some pins are tapered from the bottom to the tip. The paper tends to ride up the pins when subjected to heavy loading particularly with multipart forms such as is used in high speed printers. Another pin structure uses a tapered cap on top of a cylindrical base. Within the tolerances of commercially available perforated paper, the pin will not fully enter the perforations and forcing entry causes distortions which can causes feed jams or other problems. Examples of belt structures having pins and gear teeth attached to a thin flexible strip and/or having various pin contours are shown in U.S. Pat. Nos. 4,611,737; 4,473,179; 3,688,959; 4,316,567; 3,825,162; and 3,392,893 and IBM Technical Disclosure Bulletin, Vol. 20, No. 11A, April 1978, pp. 4524 et seq. Examples of drive elements molded to a thin flexible strip to form a drive belt are shown in U.S. Pat. Nos. 3,825,162; 4,453,660; and Japanese Publication No. 43-23565.

SUMMARY OF THE INVENTION

The invention provides a pin belt for a tractor feed mechanism of the type used in a printer in which the pins attached to the belt are contoured to prevent interference with the sides of the holes in a perforated paper. The pins are formed with a tapered cap on top of a conical base portion. Also in accordance with the invention, the pin belt has pins and gear teeth that are integral drive elements and are attached through perforations in a thin flexible band. In the preferred form the band perforations are elliptical in shape and are uniformly spaced in a row extending between the edges of the band perforations. Preferably the band elliptical perforations have the long axis in the longitudinal direction of the band. The invention provides a pin structure which prevents distortion of the holes in the paper and a belt in which fracturing is reduced by the reduction in the concentration of stress forces produced in the vicinity of perforations in which drive elements are attached.

The foregoing and other objects, features and advantages of the invention will be apparent from the following more particular description of a preferred embodiment(s) of the invention, as illustrated in the accompanying drawing.

DETAILED DESCRIPTION OF THE INVENTION

Figure 1:
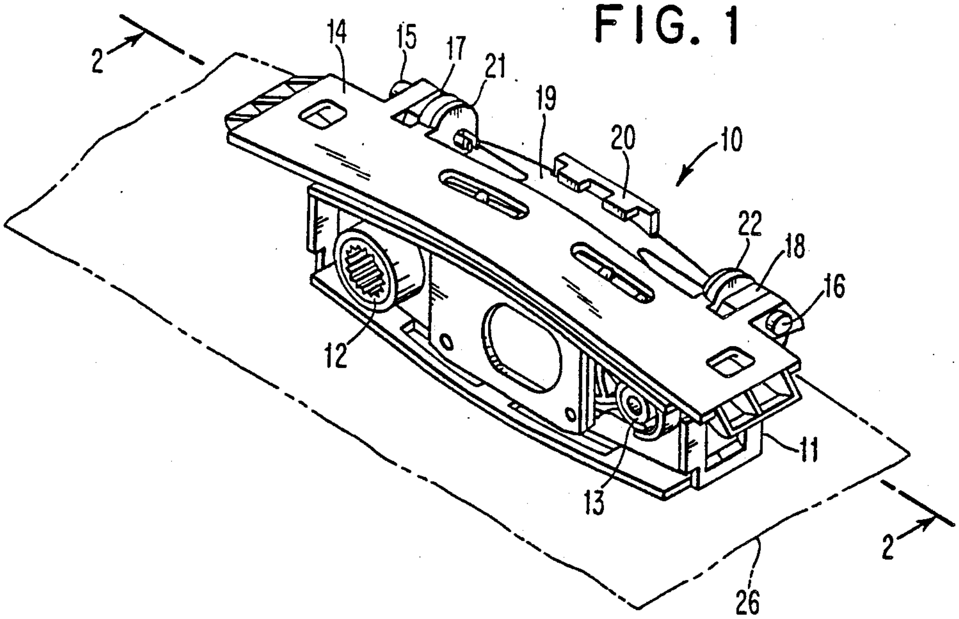
FIG. 1 is a three dimensional view of a tractor mechanism for using the invention.
Figure 2:
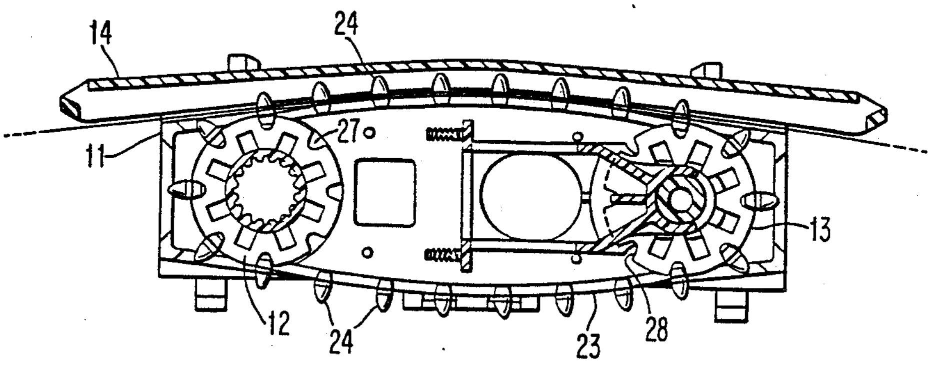
FIG. 2 is a side elevation section taken along the line 2—2 of FIG. 1.

Referring to FIGS. 1 and 2, there is shown a tractor feed mechanism 10 having a body 11 on which are journaled pulleys 12 and 13. Pulley 12 is driven by a drive shaft (not shown) which is part of a printer. Pulley 13 is an idler pulley. A door 14 is connected by hinge pins 15 and 16 to hinge posts 17 and 18 of the tractor body 11. A flat spring 19 simply supported on a platform 20 of body 11 operates on rotary cams 21 and 22, which are part of the hinge elements of door 14, to maintain the door in either the closed position as shown or in an open position. Further details of the door and spring assembly may be obtained by reference to U.S. Pat. No. 4,817,842, issued Apr. 4, 1989.

Figure 7:
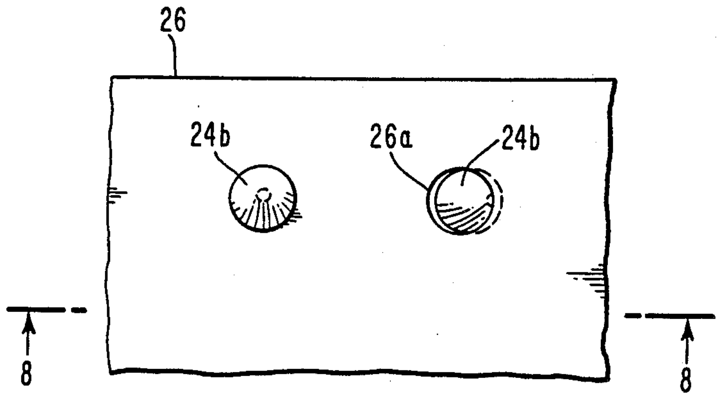
FIG. 7 is a plan view of the pin elements of a pin belt in relation to the perforations of the paper.
Figure 8:
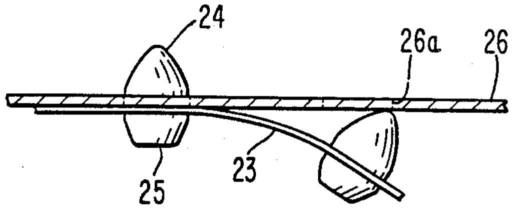
FIG. 8 is a side sectional view of the pins and paper taken along lines 8—8 of FIG. 7.

As shown in FIG. 2, a feed belt is entrained around pulleys 12 and 13. The feed belt is supported between the pulleys by a guide surface, termed a trace, on body 11. The feed belt comprises a continuous flexible band 23 with feed pins 24 on the outside and gear teeth or lugs 25 on the inside. The function of the feed pins 24 is to engage individual perforations in a row of perforations (not shown) along one edge of a continuous paper form 26 (shown with interrupted lines) or the like which is advanced through a printer of which tractor 10 is a part. As is well known, the spacing of the feed pins 24 is the same as the perforations in paper 26. The function of the gear teeth 25 is to be engaged by the pulleys which impart motion thereto for feeding paper 26. The pulleys 12 and 13 have grooves 27 and 28 respectively around their outer peripheries which receive gear teeth 25. The spacing of the grooves 27 and 28 corresponds to the spacing of the gear teeth on band 23. In the course of rotation, the gear teeth become enmeshed in the grooves as band 23 is wrapped around the pulleys, the pins 24 enter perforations 26a (see FIGS. 7 and 8) in paper 26, move the paper along the guide surface of body 11 and are withdrawn from the perforations 26a before wrapping around the second pulley.

Figure 3:
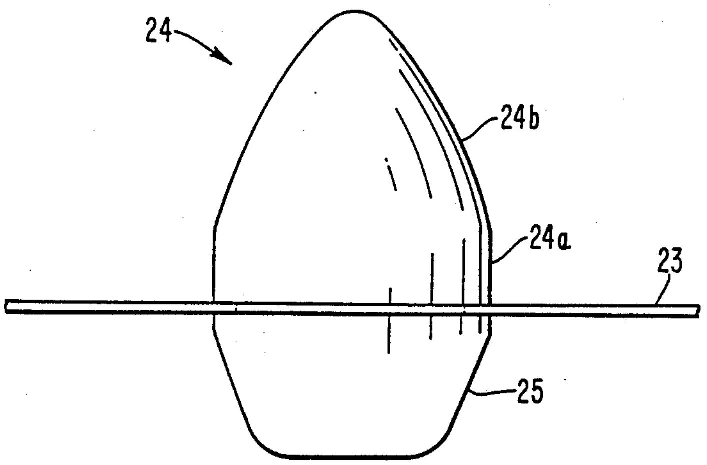
FIG. 3 PRIOR ART
FIG. 3 is a side view of a portion of a pin belt showing a particular pin structure known in the prior art.

As seen in FIG. 3, a paper feed pin 24, known in the prior art, comprises a base 24a that is cylindrical that pushes on the sides of the perforations 26a in the paper, and a cap 24b that is tapered. One form of tapering is the involute although spherical and conical caps are used. The purpose of the tapered cap is to eliminate interference between the pins and sides of the holes. An important consideration in the design of these pins is that the pin does not deform the edges of the holes in the paper during engagement and disengagement. Frictional forces oppose the relative motion between the pins and paper. The high forces caused by deformation of the paper by pins generate high frictional forces that can prevent the paper from leaving the feed pin.

Figure 5:
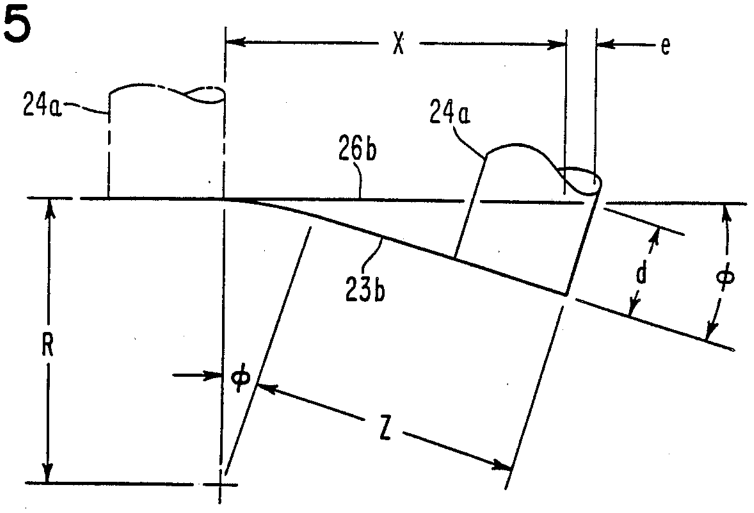
FIGS. 5 and 6 are schematic diagrams explaining the geometry of a pin in relation to the paper and pulley which form the basis of invention.

There are two phases in the process of stripping the paper from a feed pin that corresponds to the two sections of the feed pin as described. First the pin is axially withdrawn from the paper a distance equal to the height of the cylindrical base of the pin; then the pin completely withdraws from the paper as it travels around a pulley. The first phase of the process is shown in FIG. 5. Here $\phi$ is the angle of divergence between the path of the feed belt and the paper path. It is assumed that this divergence begins as the belt path describes an arc of radius R. d is the distance the base 24a has withdrawn from the paper at the second position. It is also assumed that the base 24a of the pin and the edge of the paper feed hole are in contact at the initial position shown in broken lines. Between the two positions shown, the pin travel, $R\phi+Z$ equals the paper travel, i.e. $R\phi+Z=X$;

From trigonometry and geometry, X and R are defined by the equations:

$$X+e=R\sin\phi+Z\cos\phi+d\sin\phi$$

and $$R(1-\cos\phi)+Z\sin\phi=d\cos\phi$$

The combination of these equations results in the equation:

$$e=d[(1-\cos\phi)/\sin\phi]+R[2(1-\cos\phi)/\sin\phi-\phi] \quad (1)$$

For small values of $\phi$ (i.e. less than 5.7 degrees) the following approximations can be used without causing significant error. ($\phi$ is in radians)

$$\sin\phi=\phi$$

$$\cos\phi=1-\phi^2/2$$

When these approximations are substituted into equation 1, it reduces to:

$$e=d\phi/2 \quad (2)$$

Equation 2 indicates that when the base 24a of the feed pin is a truncated cone with an angle of convergence between its sides of at least $\phi$, there will be no interference between the paper and the pin as the pin is withdrawn from the paper. The same can be stated for the entry of pin 24 into the paper.

Figure 6:
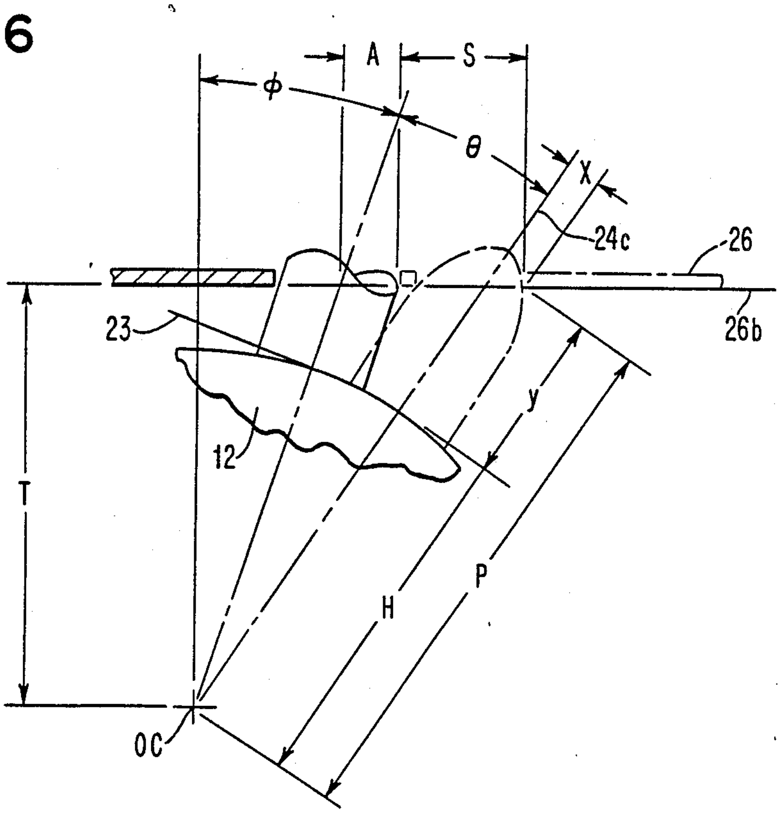

FIG. 6 depicts the second phase of the disengagement of the pin 24 from the paper 26. H is the pulley radius, P is the distance from the center OC of the pulley 12 to the point of contact between pin and paper 26 along the center of the pin, y is the height of the contact point above the base of the pin, x is the perpendicular distance between the contact point and the centerline 24c of the pin, $\phi$ is the angle of divergence, S is the distance the paper 26 advances when the pulley 12 rotates through an angle $\theta$ between the second and third positions (shown in solid and broken lines respectively, T is the perpendicular distance between the paper path 26b and the center OC of the pulley 12, and A is one half the diameter of the base 24a of the pin. From the geometry and trigonometry of FIG. 6, the following equations can be developed:

$$T=P\cos(\theta+\phi)-x\sin(\theta+\phi)$$

$$T\tan\phi+S+A=P\sin(\theta+\phi)+\cos(\theta+\phi)$$

$$y=P-H$$

$$S=H\theta$$

From these expressions are derived the following equations:

$$y=(H\theta+A)\sin(\theta+\phi)+T\cos\theta/\cos\phi-H; \quad (3)$$

$$x=(H\theta+A)\cos(74+\phi)-T\sin\theta/\cos\phi. \quad (4)$$

The path of x and y as defined by equations (3) and (4) is that of an involute. As long as the pin stays within the envelope defined by these equations, there will be no interference between the pin and the paper.

Figure 4:
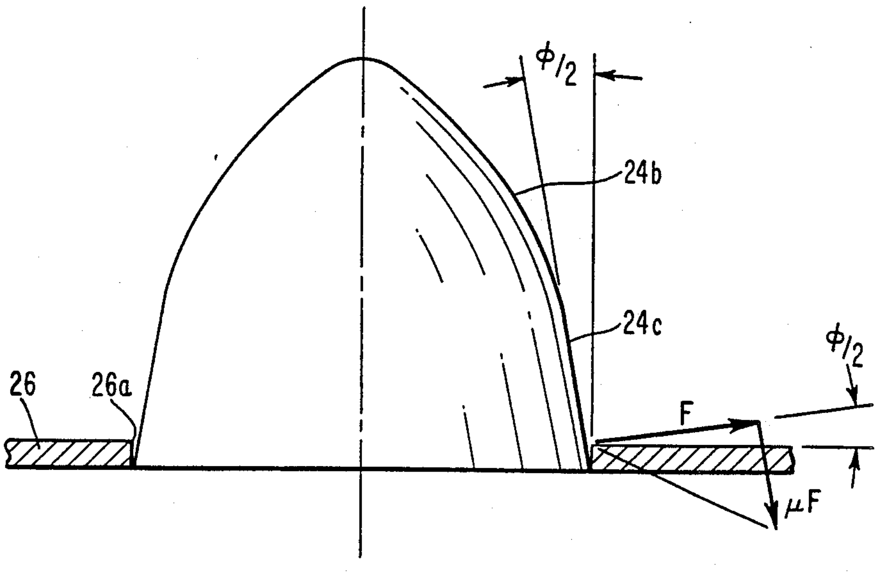
FIG. 4 is a side view showing the geometry of the new feed pin and illustrating the forces applied between the pin and the paper.

FIG. 4 shows the cross section profile of the pin 24 designed in accordance with the invention as stated in the preceding analysis. As shown, the shape of cap 24b is involute and the base 24a is a cone which is circular with a maximum base diameter equal to the diameter of the performation 26a of paper 26. The sides of the conical base 24c converge at an angle $\phi$. To avoid slippage of the paper off the conical base 24c, the angle of convergence must be less than the angle of the interaction of the forces between the paper 26 and base 24c.

FIG. 4 shows forces F and uF, where u is the coefficient of friction, illustrating the interaction between the pin base 24c and paper 26 where they engage in perforation 26a of paper 26. Friction developed between the surface of base 24c and the side of perforation 26a will prevent the paper 26 from sliding off (i.e. riding up the side of) the conical base 24c so long as $\tan(\phi/2)$ is less than u.

Figure 10:
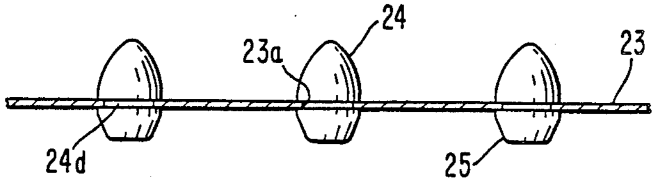
FIG. 10 is a side elevation of a portion of a pin belt with drive elements attached.

In FIG. 10 there is shown a portion of an endless pin belt comprising band 23 with drive elements attached thereto. The drive elements comprise feed pin 24 and gear tooth 25 projecting from opposite sides of band 23. Pin 24 and gear tooth 25 have a connecting portion 24d which extends through apertures 23a of band 23. The pin 24 is preferably shaped with a conical base and involute cap as shown in FIG. 4. The gear tooth 25 is a truncated triangle or is otherwise shaped so that it will mesh with similarly shaped grooves in the pulleys as seen in FIG. 2. The gear tooth 25 extends transversely to the band 23. The transverse width of tooth 25 may be less than the width of band 23 so that band 23 may be supported on either side of the tooth 25.

Figure 9:
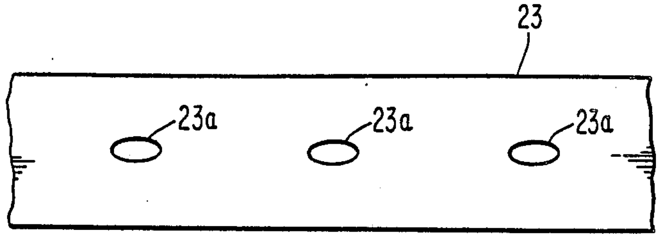
FIG. 9 is a plan view of a piece of a thin band of a pin belt showing the shape and arrangement of the perforations in the band.
Figure 11:
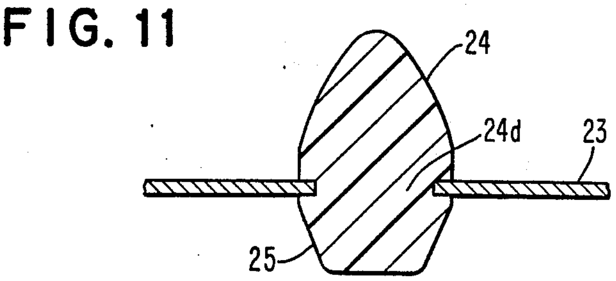
FIG. 11 is a section of one of the pins of the pin belt of FIG. 10 showing the drive elements within one of the perforations.

As seen in FIG. 9, band 23 has perforations 23a. The band perforations 23a are uniformly spaced and centrally aligned between the edges 23b and 23c. The perforations 23a are pitched to correspond with the pitch of the perforations 26a (see FIG. 4) on paper 26. As seen in FIG. 11, drive elements are one integral piece with pin 24 and gear tooth 25 projecting from opposite surfaces of band 23 with a connecting portion 24d within and through the band perforation 23a. The pin portion 24 and gear tooth portion 25 could also be separate pieces attached together with either portion having a stem or the like (not shown) extending through and engaged by the band 23 within the band perforations 23a. In either case, the connecting portion 24d or the stem of pin 24 within the band perforations 23a will have a cross section which conforms to the shape of the band perforation 23a. Band 23 may be either steel or a polymer and the integral drive element can be made by molding using a polymer such as nylon.

In accordance with a feature of this invention, the band perforations 23a have the shape of an ellipse. Further, as seen in FIG. 9 the major axes of the elliptical perforations 23a are aligned and parallel with the edges 23b and 23c of the band 23. Due to some small misalignments caused by tolerance variations or wear, the gear tooth 25 can be subjected to turning moments from the pulleys. These can become quite appreciable particularly in a tractor for a high speed printer where alternate and rapid acceleration and decelerations are constantly occurring. Gear tooth 25 will not rotate within the elliptical perforation. Elliptical holes do not concentrate stresses as much as do round holes or holes having sharp corners such as squares provided that the major axis is aligned in the direction of loading or movement, i.e. parallel to the edges 23b and 23c of the band. A further advantage that can be realized by using elliptical perforations is that they can be more precisely aligned when formed in the band 23 thereby making alignment of the gear teeth more precise where the gear teeth are mechanically attached to the pin through the band perforations.

Therefore, in accordance with the invention, a feed pin belt has been provided which has greater resistance against fracturing and which causes less damage to perforated stationery.

While the invention has been particularly shown and described with reference to preferred embodiment(s) thereof, it will be understood by those skilled in the art that various changes in form and details may be made therein without departing from the spirit and scope of the invention.

What is claimed is:

1. In a pin feed mechanism for transporting stationery having circular perforations, said mechanism including
   transport pins arranged to engage with the perforations and move said stationery along a path, the improvement comprising,
   each of said pins having a base portion,
   and a cap portion on top of and extending from said base portion,
   said cap portion having a curved surface to facilitate insertion into and withdrawal from said perforations, and
   said base portion being a circular truncated cone, said base portion having a circular base with a diameter substantially equal to the diameter of said perforations and a side surface,
   said feed mechanism including means for feeding said pins along a portion of a drive path along which said pins are gradually inserted into or withdrawn from said perforations, said portion of said drive path diverging at an angle relative to the stationery path, and
   wherein the side surface of said base portion of said pins converges at an angle equal to or greater than the angle of divergence of said portion of said drive path.

2. In a pin feed mechanism according to claim 1 wherein
   said cap portion is a circular involute on top of said truncated cone.

3. In a pin feed mechanism according to claim 1 wherein said feed mechanism comprises an endless belt on which said pins are mounted, said pins being spaced along and projecting from said belt.

* * * * *